Patented Dec. 13, 1949

2,491,285

UNITED STATES PATENT OFFICE 2,491,285

PROCESS OF PREPARING PTEROIC ACID AMIDES

Joseph Semb, Pearl River, N. Y., assignor to American Cyanamid Company, New York, N. Y., a corporation of Maine No Drawing. Application December 10, 1946, Serial No. 715,331

6 Claims. (Cl. 260—251)

This invention relates to a new process of preparing pteroylglutamic acid and related compounds.

The process of the present invention may be illustrated by means of the following equation:

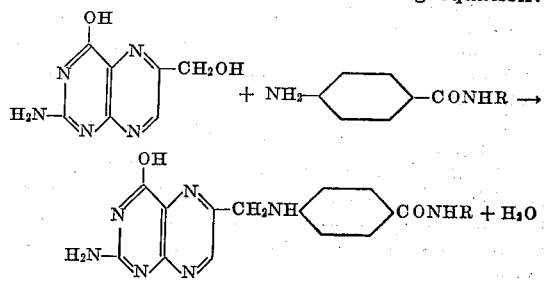

In the equation the group R represents an aliphatic radical.

The intermediate, 2-amino-4-hydroxy-6-methylol pteridine is a new compound, but its properties and a process of preparing it are described in my copending application Serial No. 715,332, filed December 10, 1946.

The aminobenzoyl intermediates are for the most part known compounds, a preferred one being p-aminobenzoylglutamic acid. When this particular compound is used in the process of the present invention the resulting product is pteroylglutamic acid or as more generally known, folic acid. The therapeutic properties of this latter substance have been well described in the literature during the past few years. p-Aminobenzoic acid itself may also be used in the reaction, as well as numerous amino acid amides thereof, such as p-aminobenzoyl glycine, p-aminobenzoyl asparate, and some having a polypeptide linkage such as p-aminobenzoyldiglutamylglutamic acid. As the reaction of the present process involves the p-amino group on the benzene ring, it will be apparent that the exact nature of the radical R is not of great importance.

My new process is preferably conducted at high temperatures, above 100° C. and up to the decomposition point of the various intermediates or the product. A preferred procedure is to heat the intermediates in an inert liquid or solvent at temperatures around 180° to 200° C. A very useful solvent of this type is ethylene glycol which normally boils at around 196° C. Other solvents such as glycerol may, of course, be employed. If desired, the reaction may be conducted in a pressure autoclave whereby the higher temperatures may be readily obtainable.

The time of reaction will depend somewhat upon the temperature, the higher temperatures requiring less time. At 100° C., for example, the reaction was conducted for twenty hours, and pteroylglutamic acid was obtained with a small yield. At 150° C. a small yield of pteroylglutamic acid was obtained in thirty minutes. A longer heating period would undoubtedly have given a higher yield in both cases.

As the reaction involves the removal of a molecule of water, it is of advantage to use solvents such as ethylene glycol or glycerol which tend to exert a dehydrating action. Zinc chloride and other dehydrating agents of like nature may also be added to the reaction mixture if desired.

When seeking the formation of pteroylglutamic acid and other products having biological properties, it is desirable to use salts of the p-aminobenzoyl glutamate, or the like, in that the use of such salts in the reaction seems to minimize racemization of the product.

In order to illustrate some aspects of the invention in greater particularity, the following examples are given. All parts are by weight unless otherwise indicated.

Example 1

100 parts of 2-amino-4-hydroxy-6-methylol pteridine and 320 parts of the disodium salt of p-aminobenzoylglutamic acid were dried at 100° C. under reduced pressure for three hours. To this was added 4,450 parts of ethylene glycol, and the mixture was heated for thirty minutes at 196° C. Most of the ethylene glycol was then distilled off under reduced pressure, and the residue taken up in 5,000 parts of water. The solution was acidified with hydrochloric acid, and the insoluble material was centrifuged off, washed with water and acetone, and then dried. The product, 159 parts by weight, was found to contain 24.75% of pteroylglutamic acid by biological assay.

Although the crude material as prepared above may be used for many important purposes such as adjuncts to animal feeds, further purification to pharmaceutical grades may be desirable. One suitable method appears in the copending application of Brian L. Hutchings, Serial No. 669,099, filed May 11, 1946, now Patent Number 2,457,375.

Example 2

When 20 parts of 2-amino-4-hydroxy-6-methylol pteridine, 50 parts of p-aminobenzoylglutamic acid, and 1,000 parts of ethylene glycol were heated for thirty minutes at 150° C., the crude reaction mixture was found to contain 0.91% of theory of pteroylglutamic acid.

Example 3

25 parts of 2-amino-4-hydroxy-6-methylol pteridine and 40 parts of the disodium salt of p-aminobenzoylglutamic acid were heated for thirty minutes at 196° C. in 1,500 parts of ethylene glycol. Biological assay of the crude product showed it to contain 8 parts of pteroylglutamic acid.

Example 4

The preceding experiment was repeated using an equivalent amount of p-aminobenzoylglutamic acid in place of the disodium salt. Biologically active pteroylglutamic acid was formed in this reaction in somewhat lower yields.

Example 5

25 parts of 2-amino-4-hydroxy-6-methylol pteridine, 35 parts of p-aminobenzoylglutamic acid, and 21 parts of sodium methylate were heated in 1,500 parts of ethylene glycol at 196° C. for thirty minutes. The crude reaction mixture was found to contain a larger percentage of pteroylglutamic acid than was obtained in the preceding example.

Example 6

25 parts of 2-amino-4-hydroxy-6-methylol pteridine and 35 parts of p-aminobenzoylglutamic acid were heated in 1,500 parts of ethylene glycol to which a small amount of acetic acid had been added. After heating for thirty minutes at 196° C. the reaction mixture was assayed and found to contain a substantial amount of pteroylglutamic acid.

Example 7

25 parts of 2-amino-4-hydroxy-6-methylol pteridine and 35 parts of p-aminobenzoylglutamic acid were heated with anhydrous zinc chloride in 1,500 parts of ethylene glycol for thirty minutes at 196° C. Analysis of the product showed it to contain a substantial amount of pteroylglutamic acid.

I claim:

1. A process which comprises mixing together and heating to a temperature of at least 100° C. 2-amino-4-hydroxy-6-methylol pteridine having the formula

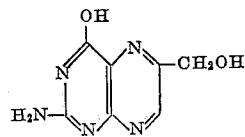

and an amino acid amide of p-aminobenzoic acid having the formula

where X is selected from the group consisting of amino acids and alkali metal salts of amino acids, and after reaction thereof recovering a product having the formula

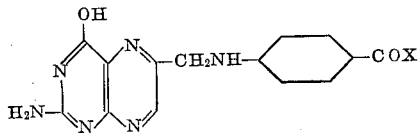

in which the group X is as defined above.

2. A process in accordance with claim 1 in which the amino acid is glutamic acid.

3. A process which comprises mixing together in an anhydrous solvent and heating to a temperature of at least 100° C. 2-amino-4-hydroxy-6-methylol pteridine and p-aminobenzoylglutamic acid, and recovering pteroylglutamic acid.

4. A process which comprises mixing together in an anhydrous solvent and heating to a temperature of at least 100° C. 2-amino-4-hydroxy-6-methylol pteridine and disodium p-aminobenzoylglutamate, and recovering pteroylglutamic acid.

5. A process which comprises mixing together in ethylene glycol and heating to a temperature of at least 100° C. 2-amino-4-hydroxy-6-methylol pteridine and an alkali metal salt of p-aminobenzoylglutamic acid, and recovering pteroylglutamic acid from the heated reaction mixture.

6. A process which comprises mixing together in ethylene glycol and heating to a temperature of at least 100° C. 2-amino-4-hydroxy-6-methylol pteridine and an alkali metal salt of p-aminobenzoyldiglutamylglutamic acid, and recovering pteroyldiglutamylglutamic acid.

JOSEPH SEMB.

No references cited.